United States Patent
Nagatsuka et al.

(10) Patent No.: US 7,881,917 B2
(45) Date of Patent: Feb. 1, 2011

(54) APPARATUS SIMULATING OPERATIONS BETWEEN A ROBOT AND WORKPIECE MODELS

(75) Inventors: Yoshiharu Nagatsuka, Yamanashi (JP); Kozo Inoue, Gotenba (JP)

(73) Assignee: Fanuc Ltd, Minamitsuru-gun, Yamanashi (JP)

( * ) Notice: Subject to any disclaimer, the term of this patent is extended or adjusted under 35 U.S.C. 154(b) by 526 days.

(21) Appl. No.: 11/806,344

(22) Filed: May 31, 2007

(65) Prior Publication Data

US 2007/0282485 A1 Dec. 6, 2007

(30) Foreign Application Priority Data

Jun. 6, 2006 (JP) ............................. 2006-157557

(51) Int. Cl.
*G06G 7/48* (2006.01)
(52) U.S. Cl. .............................................. 703/7; 703/6
(58) Field of Classification Search ..................... 703/6
See application file for complete search history.

(56) References Cited

U.S. PATENT DOCUMENTS

| | | | |
|---|---|---|---|
| 6,597,971 B2 * | 7/2003 | Kanno | 700/245 |
| 6,853,881 B2 * | 2/2005 | Watanabe et al. | 700/264 |
| 7,012,608 B1 * | 3/2006 | Fujisaki | 345/474 |
| 7,099,747 B2 * | 8/2006 | Mikami et al. | 700/245 |
| 2002/0147528 A1 * | 10/2002 | Watanabe et al. | 700/245 |
| 2004/0162639 A1 * | 8/2004 | Watanabe et al. | 700/259 |
| 2004/0199288 A1 * | 10/2004 | Watanabe et al. | 700/245 |
| 2005/0071048 A1 * | 3/2005 | Watanabe et al. | 700/259 |
| 2006/0184275 A1 * | 8/2006 | Hosokawa et al. | 700/245 |

(Continued)

FOREIGN PATENT DOCUMENTS

EP 1 026 637 A2 8/2000

(Continued)

OTHER PUBLICATIONS

Japanese Notice of Reasons for Rejection mailed Apr. 22, 2008 issued in Japanese Application No. 2006-157557 (including a partial translation thereof).

(Continued)

*Primary Examiner*—Paul L Rodriguez
*Assistant Examiner*—Aniss Chad
(74) *Attorney, Agent, or Firm*—Drinker Biddle & Reath LLP (57) ABSTRACT

A robot simulation apparatus (10) capable of creating and executing a robot program includes a virtual space creating unit (31) for creating a virtual space (60), a workpiece model layout unit (32) for automatically arranging at least one workpiece model (40) in an appropriate posture at an appropriate position in a workpiece accommodation unit model (24) defined in the virtual space, a virtual camera unit (33) for acquiring a virtual image (52) of workpiece models existing in the range of a designated visual field as viewed from a designated place in the virtual space, a correcting unit (34) for correcting the teaching points in the robot program based on the virtual image, and a simulation unit (35) for simulating the operation of the robot handling the workpieces, and as a result, interference between the robot and the workpieces can be predicted while at the same time accurately determining the required workpiece handling time.

4 Claims, 7 Drawing Sheets

U.S. PATENT DOCUMENTS

2007/0168082 A1* 7/2007 Kim et al. .................. 700/245

FOREIGN PATENT DOCUMENTS

| EP | 1 315 056 A2 | | 5/2003 |
|---|---|---|---|
| JP | 2002-331480 | | 11/2002 |
| JP | 2004130426 A | * | 4/2004 |
| JP | 2004-306182 | | 11/2004 |
| JP | 2004306182 A | * | 11/2004 |
| JP | 2005-135278 | | 5/2005 |

OTHER PUBLICATIONS

International Search Report mailed Nov. 30, 2009 issued in European Application No. 07010714.9.

D. Kugelmann., "Autonomous Robotic Handling Appplying Sensor Systems and 3D Simulation", Robotics and Automation, 1994. Proceeddings., 1994 IEEE International Conference on San Diego, CA, pp. 196-200.

* cited by examiner

APPARATUS SIMULATING OPERATIONS BETWEEN A ROBOT AND WORKPIECE MODELS

This application also claims priority under 35 U.S.C. §119 and/or §365 to Japanese Application No. 2006-157557, filed on Jun. 6, 2006, the entire contents of which are incorporated herein by reference.

BACKGROUND OF THE INVENTION

1. Field of the Invention

This invention relates to a simulation apparatus for a robot system including an imaging means and a robot.

2. Description of the Related Art

A simulation apparatus is known wherein three-dimensional models such as a robot, workpiece and peripheral devices, etc. are arranged and displayed on the screen of a computer, and based on designated robot move commands, etc., the robot motion is simulated. This simulation apparatus is used for creating a robot motion program off line, and evaluating, correcting or editing the program created off line.

However, in a place, such as an office where a robot is not actually arranged, the conventional simulation apparatus cannot substantially perform a simulation relating to the imaging means in the case of creating off line, correcting or editing a program.

Japanese Unexamined Patent Publication No. 2005-135278 discloses a simulation apparatus in which an imaging means is arranged on a three-dimensional model and the visual field of the imaging means is displayed on the three-dimensional model, and as a result, can perform the simulation relating to an imaging means.

There is a case in which a robot picks up a plurality of workpieces having the same shape stacked in bulk in a container. The plurality of workpieces are arranged irregularly three-dimensionally. At the time of picking up the workpiece, the robot hand may interfere with workpieces other than a workpiece to be picked up or the container's wall. The simulation apparatus disclosed in Japanese Unexamined Patent Publication No. 2005-135278 does not presuppose the picking up of workpieces in bulk, and therefore, interference between the robot hand and workpieces or the container cannot be predicted.

In picking up a plurality of workpieces piled in bulk from a container, the position of the robot hand in the handling operation is varied depending on the workpiece to be taken out, and therefore, time required to pick up all of the workpieces from the container cannot be accurately calculated.

This invention has been achieved in view of this situation, and the object thereof is to provide a simulation apparatus wherein the time required to pick up all of the workpieces from a container accommodating the workpieces stacked in bulk therein, is accurately determined while predicting interference between the robot and workpieces and between the robot and the container.

SUMMARY OF THE INVENTION

In order to achieve the above described object, according to a first aspect of the invention, there is provided a robot simulation apparatus capable of creating and executing a robot program, comprising a virtual space creating means for creating a virtual space for three-dimensionally expressing the working space in which the robot carries out the handling operation of workpieces, a workpiece model layout means for automatically arranging one or a plurality of models of the workpieces in an appropriate posture at appropriate positions in a workpiece layout area model defined in the virtual space created by the virtual space creating means or a workpiece accommodation means model arranged in the virtual space, a virtual camera means for acquiring a virtual image of the workpiece models existing in the range of a designated visual field designated as viewed from a designated place in the virtual space, a correcting means for correcting the teaching points of the robot program based on the virtual image acquired by the virtual camera means, and a simulation means for simulating the robot operation of handling the workpieces based on the program in which the teaching points are corrected by the correcting means.

Specifically, in the first aspect, a plurality of workpiece models are arranged in appropriate postures at appropriate positions, and therefore, the workpieces stacked in bulk in the container can be expressed on a virtual space. In the case where a plurality of workpieces in bulk are picked up, interference between the robot and the workpieces and between the robot and the container can be predicted, thereby making it possible to accurately determine the time required to pick up all of the workpieces.

According to a second aspect, there is provided a robot simulation apparatus in the first aspect, wherein the workpiece model layout means arranges a designated number of the workpiece models in the virtual space.

Specifically, in the second aspect, interference and required time can be more accurately predicted based on the number of the workpiece models arranged in the container model.

According to a third aspect, there is provided a robot simulation apparatus in the first or second aspect, wherein the workpiece model layout means arranges a plurality of the workpiece models in such a manner that the workpiece models does not share the same space.

Specifically, in the third aspect, the more accurate simulation is made possible by making sure that a plurality of workpiece models do not overlap one another in the three-dimensional virtual space.

According to a fourth aspect, there is provided a robot simulation apparatus in any one of the first to third aspects, further comprising a workpiece attribute information storage means for storing workpiece attribute information, wherein the workpiece model layout means calculates the distortion amount of each workpiece based on the workpiece attribute information stored in the workpiece attribute information storage means and the information of the contact portions of a plurality of the workpieces, and arranges the workpiece models in a deformed state based on the distortion amount.

According to a fifth aspect, there is provided a robot simulation apparatus in the fourth aspect, wherein the workpiece attribute information includes the stiffness, weight and center of gravity of the workpieces.

Specifically, in the fourth and fifth aspects, the distortion amount of the workpieces stacked in bulk is taken into account, and therefore, a more accurate simulation is possible.

According to a sixth aspect, there is provided a robot simulation apparatus in any one of the first to fifth aspects, further comprising a robot motion storage means for monitoring and storing the actual motion of the robot, wherein the workpiece model layout means, based on the actual motion of the robot stored in the robot motion storage means, calculates the position and posture of the robot hand at the time of grasping each of the plurality of the workpieces and arranges the workpiece models based on the hand position and posture thus calculated.

Specifically, in the sixth aspect, the handling operation for picking up a plurality of workpieces stacked in bulk in the container by the robot can be reproduced in a virtual space.

These and other objects, features and advantages of the present invention will be more apparent in light of the detailed description of exemplary embodiments thereof as illustrated by the drawings.

DETAILED DESCRIPTION OF THE INVENTION

An embodiment of the invention is explained below with reference to the accompanying drawings. In the drawings, the same component members are designated by the same reference numerals, respectively, and to facilitate understanding, the scale of the drawings has been appropriately changed.

Figure 1:
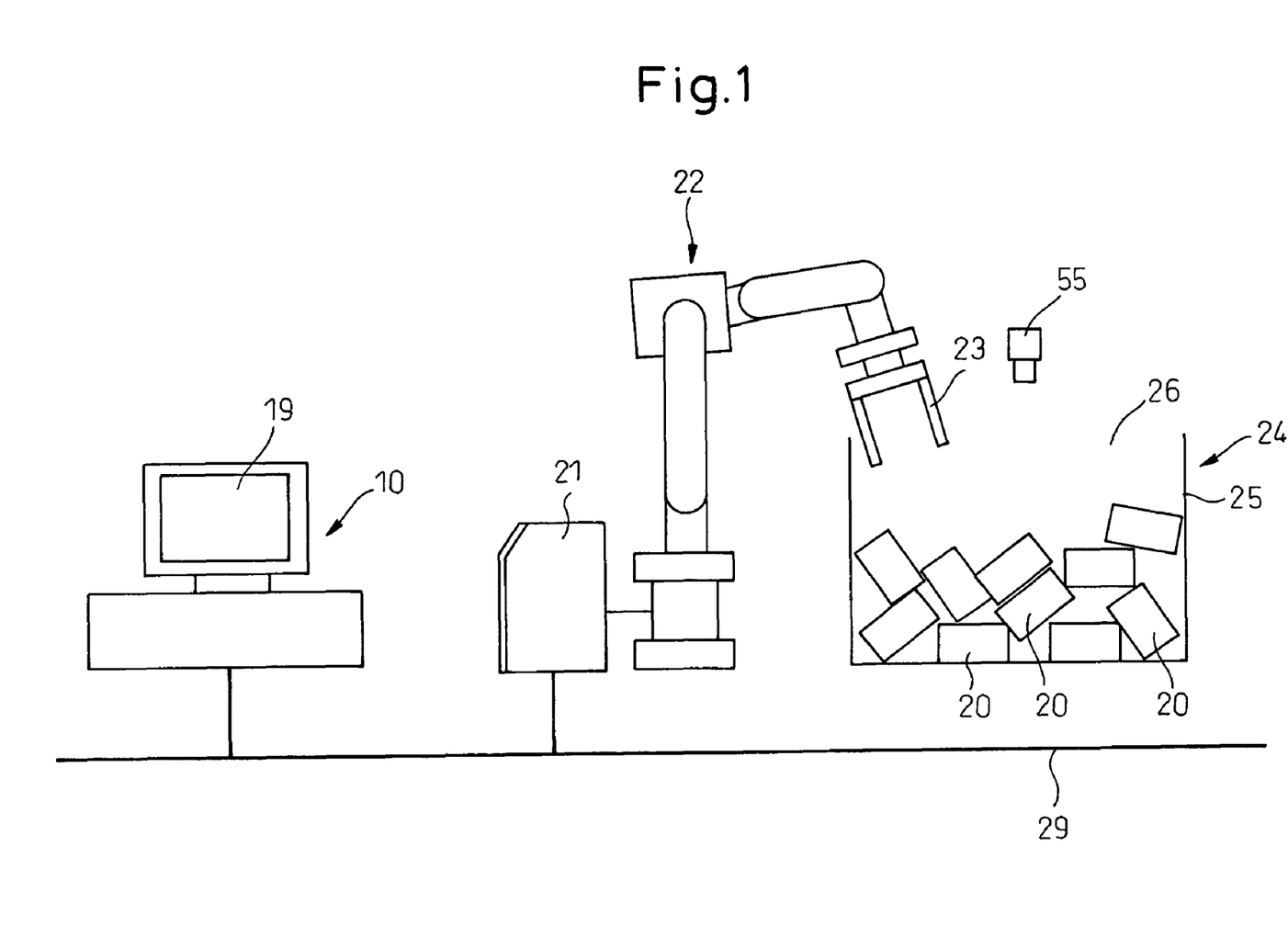
FIG. 1 shows a general arrangement of a robot simulation system according to this invention.

FIG. 1 is a diagram showing a general layout of a robot simulation system according to the invention. A robot simulation apparatus 10 shown in FIG. 1 is a digital computer, for example, and can create and execute a robot program. According to the embodiment shown in FIG. 1, the robot simulation apparatus 10 is connected to a robot controller 29 via a LAN 29, such as an Ethernet (registered trade mark) and may alternatively be connected by another method.

In FIG. 1, a cage-like container 24 is arranged at a predetermined position. As shown, a plurality of workpieces 20 having the same shape are placed in bulk in the container 24. The container 24 has an outer wall 25 whereby an opening 26 is defined. The opening 26, though rectangular in FIG. 1, may have another shape. Also, each of the plurality of the workpieces, though shown parallelepiped, may alternatively have another shape.

The robot controller 21 is connected to a robot 22 whose arm has a hand 23 at the forward end of the arm. The robot controller 21 controls the robot 22 to pick up workpieces 20 sequentially from the container 24.

An imaging means 55 such as a CCD camera is arranged at a predetermined position above the container 24. In FIG. 1, the imaging means 55 is positioned by a stand (not shown). The imaging means 55 may alternatively be mounted on a part of the robot 22.

Figure 2:
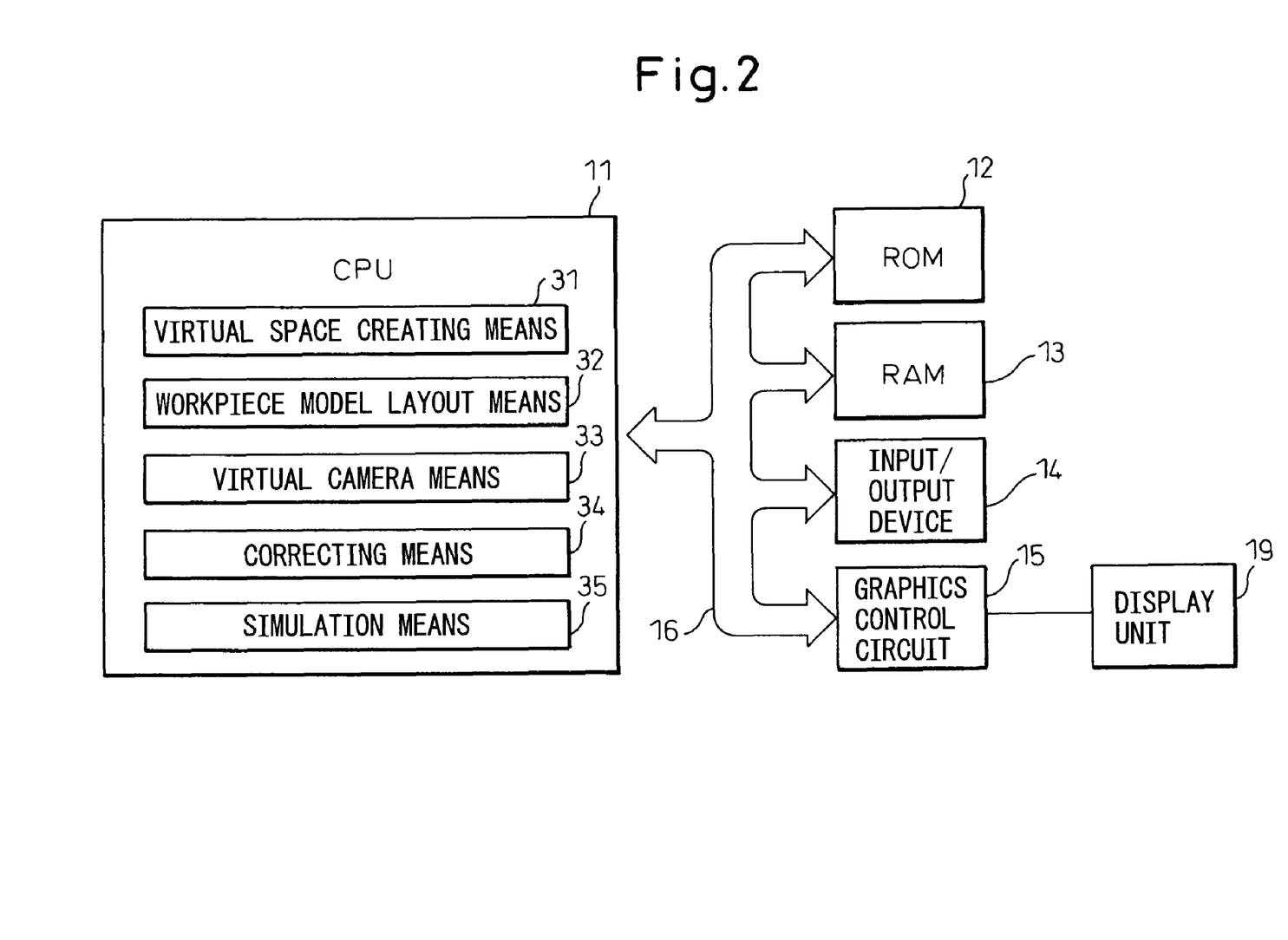
FIG. 2 is a block diagram showing a robot simulation apparatus according to this invention.

FIG. 2 is a block diagram showing the robot simulation apparatus according to the invention. As shown in FIG. 2, the robot simulation apparatus 10 includes a CPU 11, a storage unit having a ROM 12 and RAM 13, an input and output device 14 having a mouse and/or keyboard and a graphics control circuit 15, which are interconnected by a bidirectional bus 16.

The CPU 11 functions as a virtual space creating means 31 for creating a virtual space for three-dimensionally expressing the working space in which the robot 22 carries out the handling operation of the workpieces 20, a workpiece model layout means 32 for automatically arranging workpiece models of the workpieces 20 in the model of the container 24 in the virtual space, a virtual camera means 33 for acquiring a virtual image of the workpiece models in the virtual space, a correcting means 34 for correcting the teaching points in the robot program based on the virtual image and a simulation means 35 for simulating the operation of the robot 22 to handle the workpieces 20 based on the corrected program.

The RAM 13 of the storage unit has stored therein data on the three-dimensional geometric models for the robot 22, container 24, workpieces 20 and peripheral devices thereof intended for simulation. The RAM 13 also has stored therein workpiece attribute information such as the stiffness of workpieces 20, weight of the workpieces 20 and center of gravity of each workpiece 20.

Further, operation programs 100 to 400, described later for the robot simulation apparatus 10 and the robot program for operating the robot 22 are stored in the ROM 12 of the storage unit. Also, as shown, the graphics control circuit 15 is connected to a display unit 19, such as a liquid crystal monitor or CRT.

Figure 3:
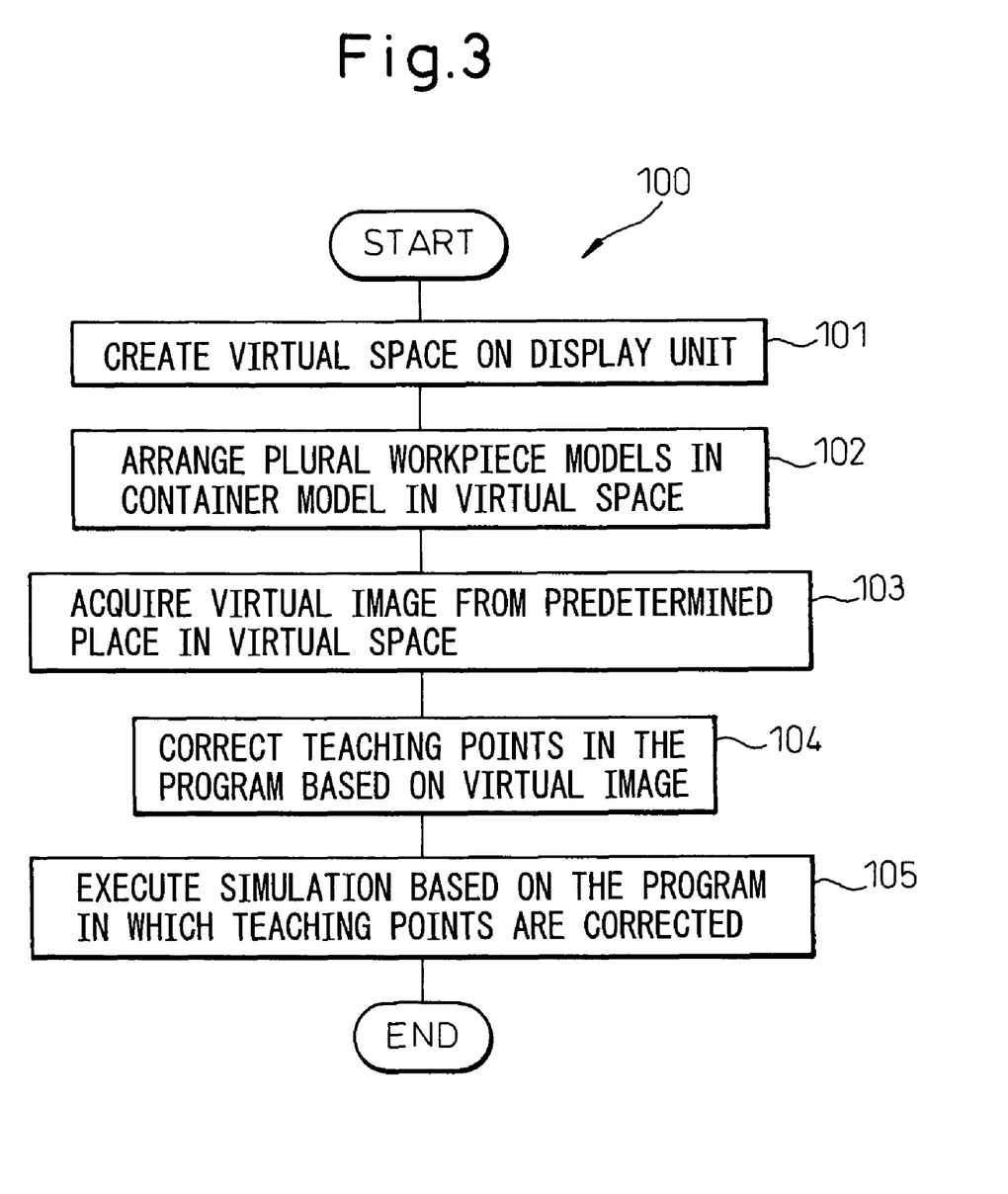
FIG. 3 is a flowchart showing the operation program of the robot simulation apparatus according to the invention.

FIG. 3 is a flowchart showing the operation program of the robot simulation apparatus according to the invention. The operation of the robot simulation apparatus 10 according to the invention is explained below with reference to the operation program shown in FIG. 3.

First, a three-dimensional virtual space 60 for carrying out the simulation is created by a virtual space creating means 31 (step 101). The three-dimensional virtual space 60 thus created is displayed on a display unit 19 via the graphics control circuit 15.

Figure 4:
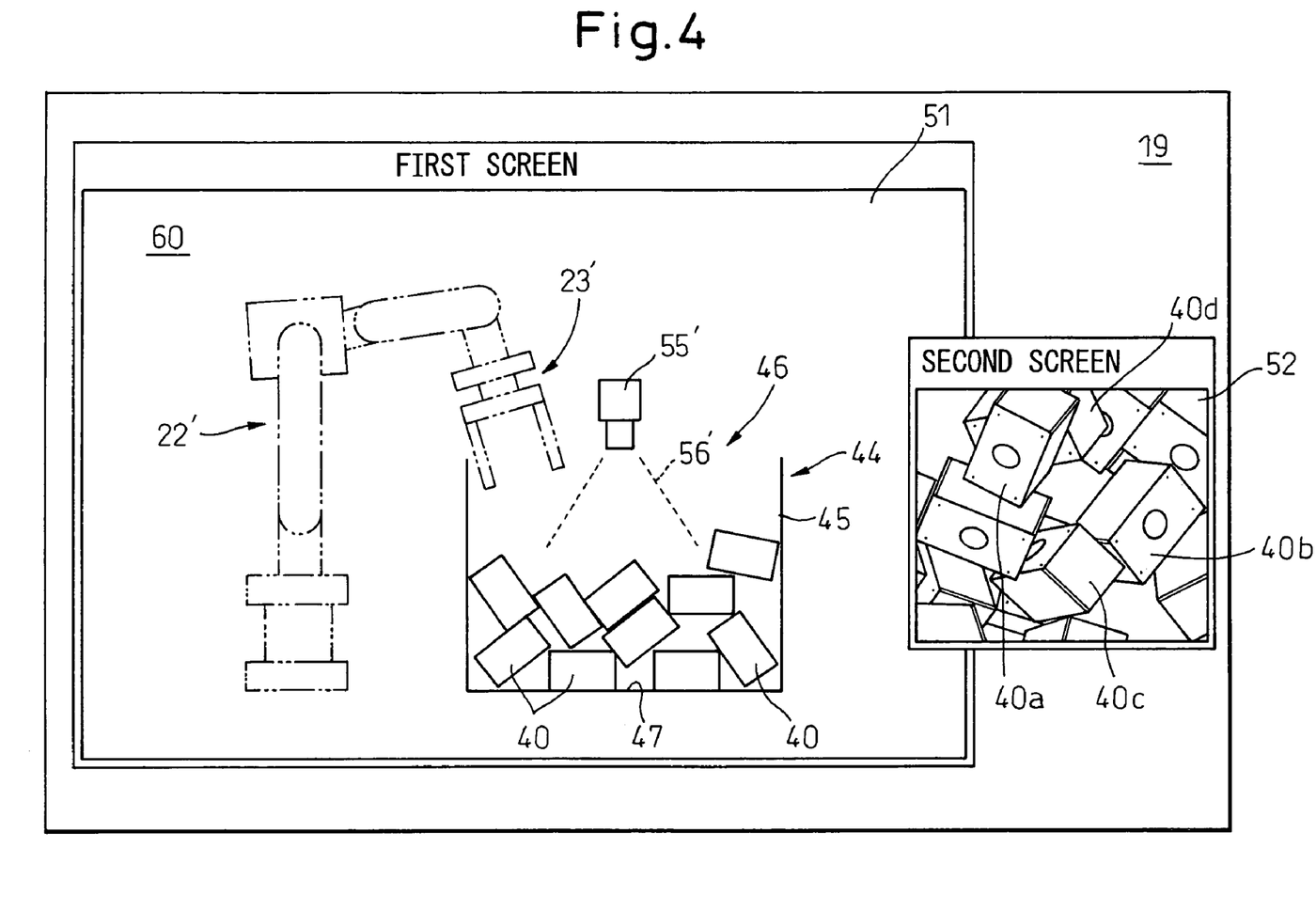
FIG. 4 is a diagram showing the three-dimensional virtual space displayed on a display unit.

FIG. 4 is a diagram showing the three-dimensional virtual space displayed on the display unit 19. In FIG. 4, the three-dimensional virtual space 60 is displayed on a first screen 51 on the display unit 19. As shown, a container model 44 corresponding to the container 24 shown in FIG. 1 is displayed in the three-dimensional virtual space 60 on the first screen 51. This container model 44 is created based on the three-dimensional geometric data stored in the storage unit, and an outer wall 45 and an opening 46 corresponding to the outer wall 25 and the opening 26, respectively, are also displayed.

Although the three-dimensional virtual space 60 is plotted as a plane in FIG. 4, the viewpoints of the three-dimensional virtual space 60 can be three-dimensionally changed by use of an input/output device, such as a mouse.

Next, the workpiece models 40 corresponding to the workpieces 20 are arranged in the three-dimensional virtual space 60 by the workpiece model layout means 32. The workpiece models 40 are also created based on the three-dimensional geometric data of the workpieces 20 stored in the storage unit.

As shown, a plurality of the workpiece models 40 are automatically arranged at appropriate positions in appropriate postures in the container model 44 by the workpiece model layout means 32. The method of arranging the plurality of the workpiece models 40 is explained below.

Figure 5:
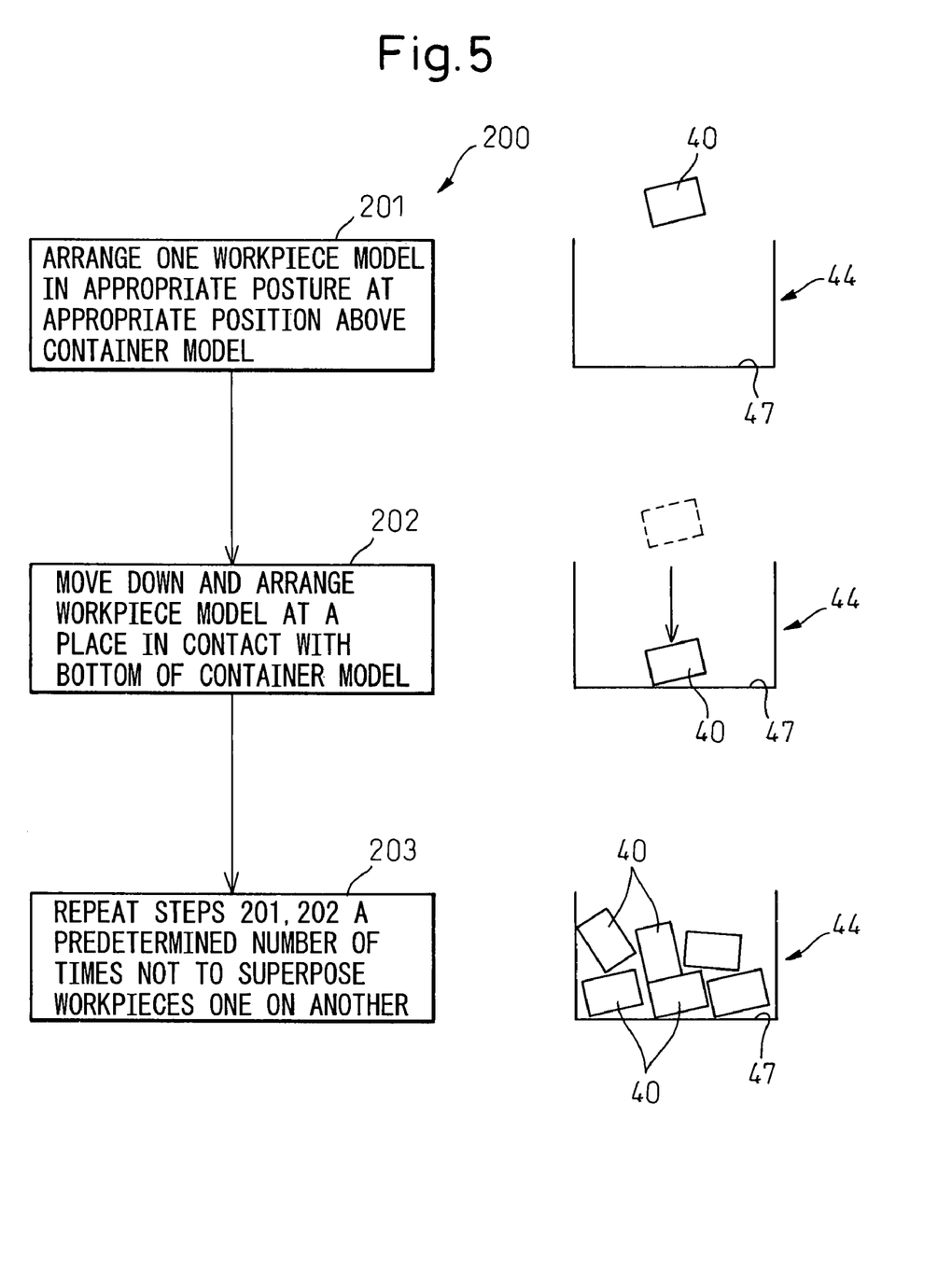
FIG. 5 is a diagram for explaining the method of arranging a plurality of workpiece models.

FIG. 5 is a diagram explaining the method of arranging the plurality of the workpiece models 40, and to facilitate explanation, FIG. 5 shows the models two-dimensionally. As indicated by step 201 of the program 200 in FIG. 5, first, one workpiece model 40 is arranged in an appropriate posture at an appropriate position above the container model 44 by the workpiece model layout means 32. The posture and position of each workpiece model 40 is determined in the workpiece model layout means 32 using a random number or the like.

Then, in step 202, the workpiece model 40 is moved down without changing the posture thereof, so that the workpiece model 40 reaches the bottom surface 47 of the container model 44.

After that, the process is returned to step 201, in which another workpiece model 40 is arranged above the container model 44 and then moved down toward the bottom surface 47. In the process, another workpiece model 40 is arranged in such a manner so as to not be superposed on the workpiece model 40 already arranged in the container model 44. As shown, another workpiece model 40 may not be in contact with the bottom surface 47 or the outer wall 45 of the container model 44. This process is repeated a predetermined number of times thereby to arrange a plurality of the workpiece models 40 in the container model 44 (step 203).

According to this invention, the posture and the position of each workpiece model 40 are determined at random using a random number or the like, and a plurality of the workpiece models 40 are arranged in a manner not to be superposed on one another. Therefore, the postures, etc. of the workpiece models 40 are very similar to the postures, etc. of the actual workpieces 20 stacked in bulk in the container 24. According to this invention, the operation of picking up a plurality of workpieces having the same shape stacked in bulk in the container can be simulated with higher accuracy.

Then, as shown in FIG. 4, a camera model 55' is arranged at a place designated in advance in the three-dimensional virtual space 60 of the first screen 51. This place corresponds to the place of the actual imaging means 55 (FIG. 1). In the three-dimensional virtual space 60 shown in FIG. 4, the camera model 55' is arranged just above the container model 44.

In FIG. 4, the dashed lines extending from the camera model 55' indicate a visual field 56' of the camera model 55'. This visual field 56' corresponds to the visual field of the actual imaging means 55 (FIG. 1). As shown, the visual field 56' of the camera model 55' covers a plurality of the workpiece models 40 arranged in the container model 44.

The camera model 55' can acquire the virtual image of the workpiece models 40 in the visual field 56' through a virtual camera means 33. The virtual camera means 33 displays the acquired virtual image as a second screen 52 on the display unit 19 (see step 103 in FIG. 3). As shown, the first screen 51 and the second screen 52 are plotted as different windows. Instead of using the second screen 52, however, the virtual image covered by the camera model 55' may be plotted at a corner of the first screen 51.

Next, based on the virtual image displayed on the second screen 52, the teaching points in the robot program are corrected by the correcting means 34. The correcting means 34 first selects an appropriate workpiece model 40 such as a workpiece model 40a from the virtual image on the second screen 52 and calculates the posture and position thereof. The robot program describes the method by which the hand 23 of the robot 22 grasps a workpiece 20 in a predetermined posture at a predetermined position. The teaching points in the robot program are thus changed based on the calculated posture and position of the workpiece model 40a so that the hand 23 of the robot 22 can grasp the workpiece model 40a.

After that, the correcting means 34 sequentially selects other workpiece models 40b, 40c, . . . and calculating the posture and position thereof similarly, changes the teaching points so that the hand 23 can grasp the workpiece models 40b, 40c, . . . (step 104).

As can be seen from FIG. 4, the workpiece model 40d is located under the workpiece model 40a, and therefore, only a part of the workpiece model 40d is shown in the second screen 52. In FIG. 4, the workpiece model 40a existing on this side constitutes an obstacle, and therefore, the posture and position of the workpiece model 40d are difficult to calculate. In such a case, the workpiece model 40a constituting an obstacle is provisionally deleted to calculate the posture and position of the workpiece model 40d at a lower position. In this way, the teaching points of the robot program are changed in such a manner that all the workpiece models 40 can be grasped.

Next, the robot model 22' of the robot 22 is displayed in the three-dimensional virtual space 60 on the first screen 51. Based on the robot program corrected by the correcting means 34, the simulation means 35 operates the robot model 22' by simulation on the three-dimensional virtual space 60 (step 105). The simulation operation by the simulation means 35 may be performed on other screen from the first screen 51.

By this simulation, the hand model 23' of the robot model 22' performs the operation of sequentially picking up the workpiece models 40 arranged in the container model 44. As a result, it is possible to predict on the simulation screen whether the hand 23 will be interrupted by the outer wall 25 of the container 24 and other workpieces other than the workpiece 20 to be grasped.

In the case where the interrupting of the hand 23 with the outer wall 25 is comparatively light, the dimensions of the container model 44 may be changed on the three-dimensional virtual space 60, and the simulation may be repeated until the interruption is avoided, and as a result, the optimum size of the container 24 can be studied using the simulation.

Similarly, in the case where interrupting of the hand 23 with other workpieces 20 is comparatively light, the hand model 23' of the optimum size can be studied similarly by changing the size of the hand model 23' on the three-dimensional virtual space 60.

Further, according to this invention, the teaching points of the robot program are changed for each of the workpiece models 40 corresponding to a plurality of the workpieces 20. Specifically, the posture of the hand 23 in the handling operation is successively changed in accordance with the specific workpiece 20 to be grasped. Therefore, according to this invention, the time required to pick up all of the plurality of the workpieces 20 from the container 24 can be accurately calculated in advance.

From this, it is possible to construct a picking up system with a robot to pick up a plurality of workpieces having the same shape stacked in bulk in a container, the use of the robot simulation apparatus according to this invention can shorten the startup time of the picking up system.

The number of the workpiece models 40 arranged in the three-dimensional virtual space 60 can of course be easily changed by use of an input/output device 14, such as a mouse and/or keyboard. In other words, the simulation can be carried out more accurately by matching the number of the workpiece models 40 with the number of the actual workpieces 20.

Figure 6A:
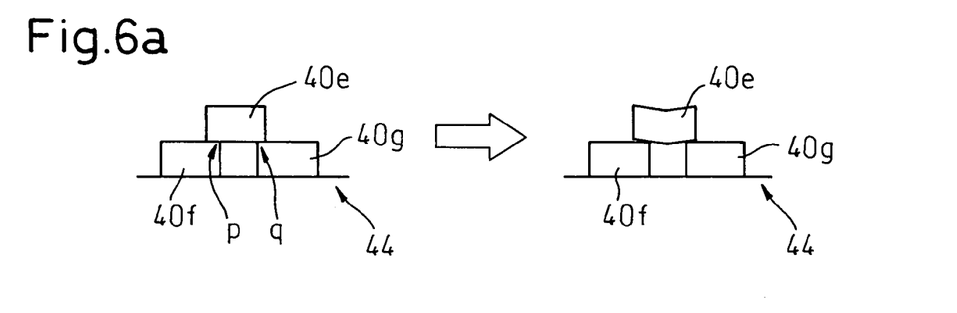
FIG. 6a is a diagram showing a workpiece model supported at two supporting points.

As shown on the left side of FIG. 6a, this is a case in which one workpiece model 40e may be arranged over two other workpiece models 40f, 40g in the container model 44. In other words, the workpiece model 40e is supported at a supporting point p on the workpiece model 40f and a supporting point q on the workpiece model 40g. In such a case, the workpiece model 40e is distorted between the supporting points p and q, and therefore, it is preferable to display the workpiece model 40e while taking the distortion amount thereof into account.

Figure 6B:
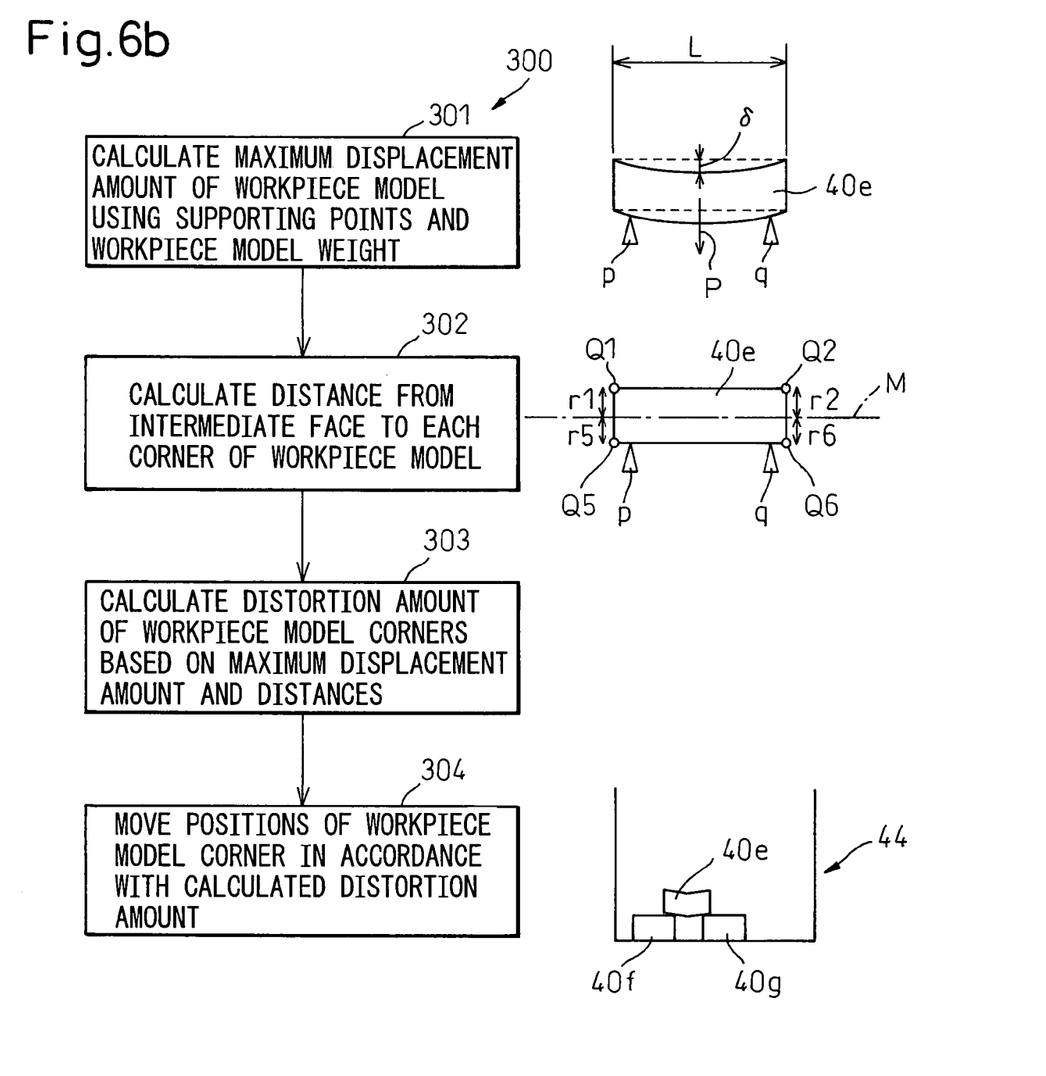
FIG. 6b is a diagram showing the method of displaying a workpiece model based on the distortion amount of a workpiece.

FIG. 6b is a diagram showing the method of displaying a workpiece model based on the distortion amount of a workpiece. First, the distance L between the supporting points p and q is calculated based on the relative positions of the workpiece models 40e, 40f, 40g. Then, the maximum displacement δ is calculated from Equation (1) below (step 301).

$$\delta = P \cdot L^3 / (48 \cdot E \cdot I) \qquad (1)$$

where P is the weight of the workpiece 20, and E and I the modulus of elasticity and the geometrical moment of inertia, respectively. The weight P, the modulus of elasticity E and the geometrical moment of inertia I are stored in the ROM 12 of the storage unit in advance.

Next, the intermediate face M of the workpiece model 40e extending in parallel to the line segment connecting the supporting points p and q is set. Then, the distance r to each corner of the workpiece model 40e from the intermediate surface M is determined. The workpiece model 40e, if parallelopipedal as shown, has eight corners Qi (=Q1 to Q8), and therefore, eight distances ri (=r1 to r8) are determined (step 302). It should be noted that FIG. 6b shows only two upper corners Q1, Q2, two lower corners Q5, Q6 and the distances r1, r2, r5, r6 to them.

Then, the distortion amount εi (=ε1 to ε8) for each of the eight corners of the workpiece model 40e is calculated from Equation (2) below (step 303).

$$\epsilon i = ri / \rho \qquad (2)$$

where ρ is the radius of curvature of the intermediate face.

After that, as shown on the right side of FIG. 6a, all the corners Qi of the workpiece model 40e on the three-dimensional virtual space 60 are moved in accordance with the calculated distortion amounts εi and the workpiece model 40e is displayed again.

Although the workpiece model 40e is shown two-dimensionally in FIGS. 6a, 6b, the actual workpiece 20 is three-dimensional. The four corners Q1 to Q4 located above the intermediate face M, therefore, are compressed toward the center of the workpiece model 40e. The remaining four corners Q5 to Q8 located under the intermediate face M, on the other hand, are extended outward away from the center.

The distortion amount is of course similarly calculated for other workpiece models 40 and the corners thereof moved. In such a case, it is apparent that the three-dimensional virtual space 60 obtained is higher in accuracy, and therefore, a more accurate simulation is possible. Especially, the embodiment shown in FIG. 6 is advantageously applicable in the case where the workpieces 20 piled in the container 24 are liable to be deformed with comparative ease.

FIGS. 6a, 6b explained above assume that the workpiece model 40e is substantially horizontal. Nevertheless, it is apparent that the distortion amount can be similarly calculated and the corners of a workpiece model moved by a similar method also in the case where the particular workpiece model is inclined by other workpiece models.

In picking up a plurality of workpieces 20 stacked in bulk in the container 24 as shown in FIG. 1, the posture and position of the hand 23 grasping the workpieces 20 undergo a change each time. After picking up of all of the workpieces 20 in the container 24, the manner in which the workpieces 20 have so far been arranged in the container 24 cannot be confirmed, and as a result that the handling operation of the robot 22 cannot be reproduced.

Figure 7:
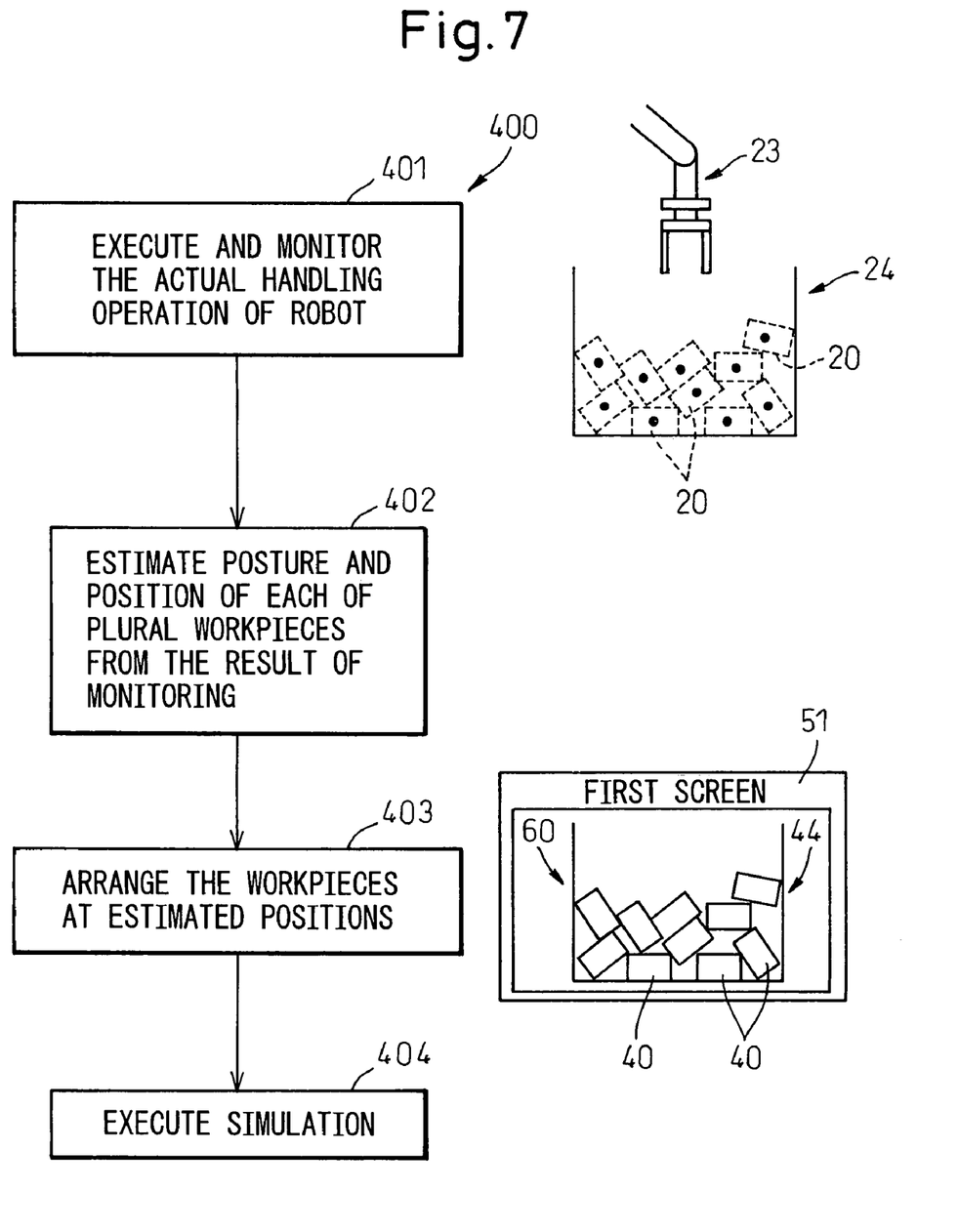
FIG. 7 is a diagram for explaining the method of reproducing the actual motion of the robot in a virtual space.

In contrast, according to the invention, the handling operation of the robot 22 for picking up a plurality of the workpieces 20 piled in bulk in the container 24 can be reproduced. FIG. 7 is a diagram explaining the method of reproducing the actual operation of the robot in virtual space, and is explained below with reference to FIG. 7.

First, the robot 22 shown in FIG. 1 is actually operated thereby to successively pick up a plurality of workpieces 20 stacked in bulk in the container 24. In the process, the robot simulation apparatus 10 monitors the motion of the robot 22 at every sampling period, and stores the result of monitoring in the RAM 13 (step 401). Thus, the result of monitoring contains the posture and position of the hand 23 when grasping each of a plurality of the workpieces 20 and the timing of opening/closing of the hand 23. The black circles in FIG. 7 designate teaching points.

Next, based on the posture, etc. of the hand 23 thus retrieved, the posture and position of the workpieces 20 grasped by the hand 23 are estimated (step 402). This estimation is carried out for all of the workpieces 20 picked up from the container 24.

After the container model 44 is created in the three-dimensional virtual space 60 on the first screen 51, a plurality of the workpiece models 40 are arranged in the container model 44 by the workpiece model layout means 32 based on the estimated postures, etc. of the plurality of the workpieces 20 (step 403), and as a result, the plurality of the workpieces 20 stacked in bulk in the actual container 24 can be reproduced in the three-dimensional virtual space 60.

After that, the robot model 22' (not shown in FIG. 7) is displayed in the three-dimensional virtual space 60, and the simulation operation of the robot model 22' is carried out using the simulation means 35 (step 404). In the robot simulation apparatus 10 according to this invention, the handling operation of the robot 22 for picking up the plurality of the workpieces 20 stacked in bulk in the container 24 can be reproduced. In the case where an error occurs during the picking up operation of the plurality of the workpieces 20 in the container 24 by the actual robot 22, the cause of the error can be verified by the reproducing operation described above.

Although a plurality of the workpieces 20 are arranged in the container 24 according to the embodiment explained above with reference to the drawings, this invention is also applicable to a case in which the plurality of the workpieces 20 are arranged in a predetermined workpiece stock area on the floor.

Although the invention has been shown and described with exemplary embodiments thereof, it should be understood by those skilled in the art that the foregoing and various other changes, omissions and additions may be made therein and thereto without departing from the spirit and scope of the invention.

What is claimed is:

1. In a computing environment, a method comprising:

A robot simulation apparatus capable of creating and executing a robot program, comprising:

a display means; a virtual space creating means for creating a virtual space on the display means for three-dimensionally expressing a working space in which a robot carries out a handling operation of workpieces;

a workpiece model layout means for automatically arranging one or a plurality of workpiece models in appropriate postures at appropriate positions in selected one of a workpiece layout area model defined in the virtual space created by the virtual space creating means and a workpiece accommodation means model arranged in the virtual space, the workpiece model layout means arranges one workpiece model in a posture at a position, which are determined using a random number, above the workpiece accommodation means model and moves down the one workpiece model toward a bottom surface of the workpiece accommodation means model without changing the posture of the one workpiece model so that the one or plurality of workpiece models are automatically arranged;

a virtual camera means for acquiring a virtual image of the workpiece models existing in a range of a designated visual field as viewed from a designated place in the virtual space;

a correcting means for correcting teaching points of the robot program based on the virtual image acquired by the virtual camera means; and a simulation means for simulating a robot operation of handling the workpieces based on a program in which the teaching points are corrected by the correcting means.

2. The robot simulation apparatus according to claim 1, further comprising a workpiece attribute information storage means for storing workpiece attribute information, wherein the workpiece model layout means calculates a distortion amount of the workpieces based on a workpiece attribute information stored in the workpiece attribute information storage means and the information of the contact portions of the plurality of the workpiece models, and arranges the workpiece models in the deformed state based on the distortion amount.

3. The robot simulation apparatus according to claim 2, wherein the workpiece attribute information include the stiffness, the weight and the center of gravity of the workpieces.

4. The robot simulation apparatus according to claim 1, further comprising a robot motion storage means for monitoring and storing the actual motion of the robot, wherein the workpiece model layout means, based on the actual motion of the robot stored in the robot motion storage means, calculates the position and posture of the robot hand at the time of grasping each of the plurality of the workpieces and arranges the workpiece models based on the hand position and posture thus calculated.

* * * * *